United States Patent
Qu et al.

(10) Patent No.: US 12,241,000 B2
(45) Date of Patent: Mar. 4, 2025

(54) MOISTURE-CURABLE HOT-MELT ADHESIVE COMPOSITION, BONDED OBJECT, AND GARMENT

(71) Applicant: Showa Denko Materials Co., Ltd., Tokyo (JP)

(72) Inventors: Shujie Qu, Tokyo (JP); Souichirou Komiya, Tokyo (JP); Takuya Imai, Tokyo (JP); Kazuyuki Magome, Tokyo (JP); Junichi Kamei, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 457 days.

(21) Appl. No.: 17/605,661

(22) PCT Filed: Nov. 21, 2019

(86) PCT No.: PCT/JP2019/045681
§ 371 (c)(1),
(2) Date: Oct. 22, 2021

(87) PCT Pub. No.: WO2020/217574
PCT Pub. Date: Oct. 29, 2020

(65) Prior Publication Data
US 2022/0204826 A1 Jun. 30, 2022

(30) Foreign Application Priority Data
Apr. 26, 2019 (JP) ................. 2019-086079

(51) Int. Cl.
*C09J 175/06* (2006.01)
*C08G 18/12* (2006.01)
(Continued)

(52) U.S. Cl.
CPC ............ *C09J 175/06* (2013.01); *C08G 18/12* (2013.01); *C08G 18/4216* (2013.01); *C09J 7/35* (2018.01);
(Continued)

(58) Field of Classification Search
CPC ................ C08G 18/40; C08G 18/4018; C08G 18/1236; C08G 18/4216; C08G 18/4825; C08G 18/7671; C08G 18/307; C08G 18/284; D06M 15/572; D06M 23/18; D06M 17/10; B32B 2437/00; B32B 29/02;
(Continued)

(56) References Cited

FOREIGN PATENT DOCUMENTS

| CN | 101885828 | * 11/2012 |
| CN | 109072036 | * 12/2018 |

(Continued)

*Primary Examiner* — Camie S Thompson
(74) *Attorney, Agent, or Firm* — FITCH, EVEN, TABIN & FLANNERY, LLP

(57) ABSTRACT

A moisture-curable hot-melt adhesive composition is disclosed. This moisture-curable hot-melt adhesive composition contains: a urethane prepolymer including a polymer chain, which includes a structural unit derived from a polyol and a structural unit derived from a polyisocyanate, and having two or more isocyanate groups; and a modified urethane prepolymer including a polymer chain, which includes a structural unit derived from a polyol and a structural unit derived from a polyisocyanate, and having one or more isocyanate groups modified with a castor oil monool.

12 Claims, 1 Drawing Sheet

(51) Int. Cl.
*C08G 18/42* (2006.01)
*C09J 7/35* (2018.01)
*D06M 15/572* (2006.01)

(52) U.S. Cl.
CPC ...... *D06M 15/572* (2013.01); *C09J 2203/358* (2020.08); *C09J 2301/304* (2020.08); *Y10T 442/2738* (2015.04)

(58) Field of Classification Search
CPC .............. B32B 29/005; B32B 2250/02; B32B 2255/26; B32B 17/12; B32B 5/263; B29C 66/729; B29C 65/484; B29C 65/4815; A41H 43/04; C09J 2203/358; C09J 7/35; C09J 175/06
See application file for complete search history.

(56) References Cited

FOREIGN PATENT DOCUMENTS

| | | | |
|---|---|---|---|
| JP | H10-088097 A | | 4/1998 |
| JP | 2002294201 | * | 10/2002 |
| JP | 2016-074996 A | | 5/2016 |
| JP | 2016-121351 A | | 7/2016 |
| JP | 2016-160344 | | 9/2016 |
| JP | 2017-020037 A | | 1/2017 |

\* cited by examiner

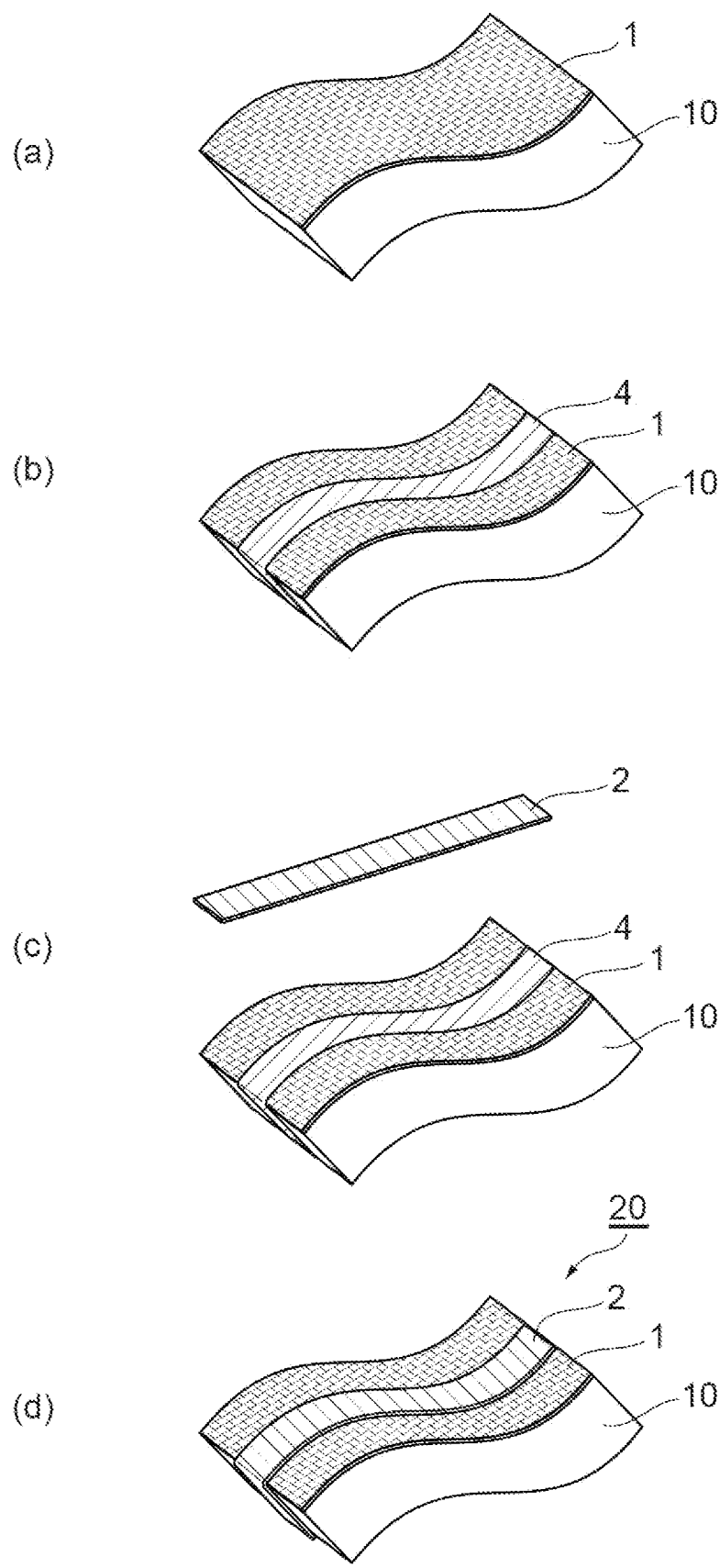

MOISTURE-CURABLE HOT-MELT ADHESIVE COMPOSITION, BONDED OBJECT, AND GARMENT

CROSS-REFERENCE TO RELATED APPLICATIONS

This application is a U.S. national phase application filed under 35 U.S.C. § 371 of International Application No. PCT/JP2019/045681, filed Nov. 21, 2019, designating the United States, which claims priority from Japanese Application No. 2019-086079, filed Apr. 26, 2019, which are hereby incorporated herein by reference in their entirety.

TECHNICAL FIELD

The present invention relates to a moisture-curable hot-melt adhesive composition, a bonded object, and a garment.

BACKGROUND ART

Hot-melt adhesives do not impose a heavy burden on the environment and human body due to them being solvent-free adhesives, and they are suitable for improving productivity through their faster adhering time. The hot-melt adhesives can be roughly classified into two categories, which are those containing a thermoplastic resin as a main component and those containing a reactive resin as a main component. As those containing a reactive resin as a main component, urethane prepolymers having an isocyanate group at the terminal are mainly used. After coating, a reactive hot-melt adhesive containing a urethane prepolymer as a main component exhibits some degree of adhesive strength in a short time due to the cooling solidification of the adhesive itself. Then, the terminal isocyanate group of the urethane prepolymer reacts with moisture (moisture in air or moisture on the surface of an adherend), so that the molecular weight increases and cross-linking is generated to thereby form a cured product and exhibit heat resistance. The reactive hot-melt adhesive having such properties is called a moisture-curable hot-melt adhesive. Thus, the moisture-curable hot-melt adhesive containing a urethane prepolymer as a main component tends to exhibit a favorable adhesive strength even when heated.

In recent years, the moisture-curable hot-melt adhesive is being used also in cloths, paper, and the like that are materials for garments, diapers, and the like. Furthermore, wearable products are successively being developed, and thus a demand for an adhesive having high stretchability in addition to adhesiveness is being increased. As a moisture-curable hot-melt adhesive that is used in such use applications, for example, adhesives described in Patent Literatures 1 and 2 are disclosed.

CITATION LIST

Patent Literature

Patent Literature 1: JP No. H10-088097
Patent Literature 2: JP No. 2017-020037

SUMMARY OF INVENTION

Technical Problem

However, a conventional moisture-curable hot-melt adhesive is not sufficient in terms of stretchability and there is still room for improvement.

The present invention is made in view of such circumstances, and a main object thereof is to provide a moisture-curable hot-melt adhesive composition capable of forming a cured product having excellent stretchability.

Solution to Problem

An aspect of the present invention provides a moisture-curable hot-melt adhesive composition containing: a urethane prepolymer including a polymer chain, which includes a structural unit derived from a polyol and a structural unit derived from a polyisocyanate, and having two or more isocyanate groups; and a modified urethane prepolymer including a polymer chain, which includes a structural unit derived from a polyol and a structural unit derived from a polyisocyanate, and having one or more isocyanate groups modified with a castor oil monool. According to such a moisture-curable hot-melt adhesive composition, a cured product having excellent stretchability can be formed. The reason for this is not necessarily clear, but the present inventors have considered that a moiety (residue) derived from the castor oil monool that is a molecular end of the modified urethane prepolymer has flexibility and lubricity, and the molecular end that can freely move contributes to exhibiting excellent stretchability.

The polyol in the urethane prepolymer and the polyol in the modified urethane prepolymer may include an amorphous polyester polyol and a crystalline polyester polyol.

The moisture-curable hot-melt adhesive composition may be used for pasting a plurality of adherends selected from cloths and paper to each other. Herein, combinations of adherends may be a cloth and a cloth, paper and paper, or a cloth and paper.

The present invention may further relate to an application of a composition containing the aforementioned urethane prepolymer and the aforementioned modified urethane prepolymer as a moisture-curable hot-melt adhesive that is used for pasting a plurality of adherends selected from cloths and paper to each other or an application of the composition for producing a moisture-curable hot-melt adhesive that is used for pasting a plurality of adherends selected from cloths and paper to each other.

Another aspect of the present invention provides a bonded object including: a first adherend; a second adherend; and an adhesive layer bonding the first adherend and the second adherend to each other, in which the adhesive layer contains a cured product of the aforementioned moisture-curable hot-melt adhesive composition.

Still another aspect of the present invention provides a garment including the aforementioned bonded object, in which the first adherend and the second adherend are cloths. The garment may be a seamless garment.

Advantageous Effects of Invention

According to the present invention, there is provided a moisture-curable hot-melt adhesive composition capable of forming a cured product having excellent stretchability. Furthermore, according to the present invention, there is provided a bonded object using such a moisture-curable hot-melt adhesive composition. Further, according to the present invention, there is provided a garment including such a bonded object.

BRIEF DESCRIPTION OF DRAWINGS

FIG. 1 is a schematic diagram illustrating a process of producing a bonded object of an embodiment, and FIGS. 1(a), 1(b), 1(c), and 1(d) are schematic diagrams illustrating respective steps.

DESCRIPTION OF EMBODIMENTS

Hereinafter, modes for carrying out the present invention will be specifically described. However, the present invention is not limited to the following embodiments.

In the present specification, "polyol" means a compound having two or more hydroxyl groups in the molecule.

In the present specification, "polyisocyanate" means a compound having two or more isocyanate groups in the molecule.

[Moisture-Curable Hot-Melt Adhesive Composition]

A moisture-curable hot-melt adhesive composition of an embodiment contains: a urethane prepolymer including a polymer chain, which includes a structural unit derived from a polyol and a structural unit derived from a polyisocyanate, and having two or more isocyanate groups; and a modified urethane prepolymer including a polymer chain, which includes a structural unit derived from a polyol and a structural unit derived from a polyisocyanate, and having one or more isocyanate groups modified with a castor oil monool. Generally, the molecular weight of the moisture-curable hot-melt adhesive composition is increased by a chemical reaction so as to be capable of exhibiting adhesiveness or the like. The urethane prepolymer is reacted with moisture to increase the molecular weight so as to be cured (to form a cured product), and thus may act as a main component of the moisture-curable hot-melt adhesive. On the other hand, it is speculated that the modified urethane prepolymer acts mainly on improvement in stretchability.

<Urethane Prepolymer>

The urethane prepolymer includes a polymer chain, which includes a structural unit derived from a polyol (component (a)) and a structural unit derived from a polyisocyanate (component (b)), and has two or more isocyanate groups. That is, the urethane prepolymer is a reaction product between the polyol and the polyisocyanate and has two or more isocyanate groups as the terminal group of the main chain or the side chain group of the polymer chain. Note that, the urethane prepolymer means a compound that does not have an isocyanate group modified with a castor oil monool described below, and the urethane prepolymer is a concept that does not include a modified urethane prepolymer described below. The adhesive composition of the present embodiment contains such a urethane prepolymer, and thereby excellent adhesive strength after moisture curing can be exhibited.

Component (a): Polyol

The component (a) can be used without particular limitation as long as it is a compound that has two or more hydroxyl groups. The component (a) may be a compound (diol) having two hydroxyl groups. The polyol may include a polyester polyol from the viewpoint of further improving adhesive strength. The component (a) may further include a polyether polyol. Such a urethane prepolymer may include a polymer chain which includes a structural unit derived from a polyester polyol, a structural unit derived from a polyether polyol, and a structural unit derived from a polyisocyanate.

The polymer chain includes a structural unit derived from a polyester polyol, and thereby solidification time and viscosity of the adhesive composition can be adjusted. As the polyester polyol, a compound that is generated by a polycondensation reaction between a polyhydric alcohol and a polycarboxylic acid can be used. The polyester polyol may be, for example, a polycondensate of a polyhydric alcohol having 2 to 15 carbon atoms and two or three hydroxyl groups, and a polycarboxylic acid having 2 to 14 carbon atoms (including carbon atoms in carboxyl groups) and having 2 to 6 carboxyl groups.

The polyester polyol may be a linear polyester diol generated from a diol and a dicarboxylic acid, or may be a branched polyester triol generated from a triol and a dicarboxylic acid. Furthermore, the branched polyester triol can also be obtained by a reaction between a diol and a tricarboxylic acid.

Examples of the polyhydric alcohol include aliphatic or alicyclic diols such as ethylene glycol, 1,2-propanediol, 1,3-propanediol, isomers of butanediol, isomers of pentanediol, isomers of hexanediol, 2,2-dimethyl-1,3-propanediol, 2-methylpropanediol, 2,4,4-trimethyl-1,6-hexanediol, 2,2,4-trimethyl-1,6-hexanediol, 1,4-cyclohexanediol, and 1,4-cyclohexanedimethanol; and aromatic diols such as 4,4'-dihydroxydiphenyl propane, bisphenol A, bisphenol F, pyrocatechol, resorcinol, and hydroquinone. The polyhydric alcohol may be used alone or may be used in combination of two or more kinds thereof. Among these, aliphatic diols are preferable, and aliphatic diols having 2 to 6 carbon atoms are more preferable.

Examples of the polycarboxylic acid include aromatic polycarboxylic acids such as phthalic acid, isophthalic acid, terephthalic acid, and 1,2,4-benzene tricarboxylic acid; and aliphatic or alicyclic polycarboxylic acids such as maleic acid, fumaric acid, aconitic acid, 1,2,3-propanetricarboxylic acid, malonic acid, succinic acid, glutaric acid, adipic acid, pimelic acid, azelaic acid, sebacic acid, cyclohexane-1,2-dicarboxylic acid, and 1,4-cyclohexadiene-1,2-dicarboxylic acid. The polycarboxylic acid may be used alone or may be used in combination of two or more kinds thereof.

Polycarboxylic acid derivatives such as carboxylic anhydrides and compounds in which a part of carboxyl groups is esterified can also be used instead of the aforementioned polycarboxylic acids. Examples of the polycarboxylic acid derivatives include dodecyl maleic acid and octadecenyl maleic acid.

The polyester polyol may be an amorphous polyester polyol (component (a-1)) and may be a crystalline polyester polyol (component (a-2)). Herein, whether a polyester polyol is amorphous or crystalline can be determined based on its state at 25° C. In the present specification, the amorphous polyester polyol means a polyester polyol that is amorphous at 25° C., and the crystalline polyester polyol means a polyester polyol that is crystalline at 25° C. The polyol in the urethane prepolymer and the polyol in a modified urethane prepolymer described below preferably include both the component (a-1) and the component (a-2).

The number average molecular weight of the component (a-1) may be 1000 to 4000 or 1500 to 2500, from the viewpoint of a balance between viscosity and adhesion force. Note that, in the present specification, the number average molecular weight is a value that is measured by gel permeation chromatography (GPC) and into which the conversion is performed in terms of standard polystyrene. Measurement of GPC can be performed under the following conditions.

Column: "Gelpack GLA130-S", "Gelpack GLA150-S", and "Gelpack GLA160-S" (manufactured by Hitachi Chemical Co., Ltd., packed columns for HPLC)

Eluent: Tetrahydrofuran
Flow rate: 1.0 mL/min
Column temperature: 40° C.
Detector: RI As the component (a-1), commercially available products can be used without any changes. Examples of the commercially available products of the component (a-1) include an amorphous polyester polyol (the number of hydroxyl groups: 2, number average molecular weight: 2000) including adipic acid and isophthalic acid and including, as a main component, ethylene glycol and neopentyl glycol, and an amorphous polyester polyol (the number of hydroxyl groups: 2, number average molecular weight: 2000) including azelaic acid and isophthalic acid and including, as a main component, ethylene glycol and neopentyl glycol. These may be used alone or may be used in combination of two or more kinds thereof.

The content of the component (a-1) may be 5 to 90% by mass, 10 to 80% by mass, or 30 to 70% by mass, on the basis of the total amount of the component (a).

The number average molecular weight of the component (a-2) may be 3000 to 8000 or 3000 to 6000, from the viewpoint of a balance between viscosity and adhesion force.

As the component (a-2), commercially available products can be used without any changes. Examples of the commercially available products of the component (a-2) include a crystalline polyester polyol (the number of hydroxyl groups: 2, number average molecular weight: 5000) including adipic acid and including, as a main component, 1,6-hexanadiol, and a crystalline polyester polyol (the number of hydroxyl groups: 2, number average molecular weight: 2000) including adipic acid and including, as a main component, ethylene glycol and 1,4-butanediol. These may be used alone or may be used in combination of two or more kinds thereof.

The content of the component (a-2) may be 10 to 70% by mass, 20 to 60% by mass, or 35 to 60% by mass, on the basis of the total amount of the component (a).

The component (a) may further include a polyether polyol (component (a-3)) in addition to the component (a-1) and the component (a-2). The number average molecular weight of the component (a-3) may be 1000 to 4000 or 1000 to 2000, from the viewpoint of a balance between viscosity and adhesion force.

As the component (a-3), commercially available products can be used without any changes. Examples of the commercially available products of the component (a-3) include PEG 4000S (manufactured by Sanyo Chemical Industries, Ltd.) and EXCENOL 2020 (manufactured by Asahi Glass Co., Ltd.). These may be used alone or may be used in combination of two or more kinds thereof.

The content of the component (a-3) may be 1 to 40% by mass, 3 to 20% by mass, or 3 to 10% by mass, on the basis of the total amount of the component (a).

The component (a) may further include other polyols other than the component (a-1) to the component (a-3) in addition to the component (a-1) to the component (a-3). Examples of the other polyols include polyacrylate polyol, polycarbonate polyol, polysiloxane polyol, polyisoprene polyol, and polyolefin polyol. The other polyols may be used alone or may be used in combination of two or more kinds thereof.

Component (b): Polyisocyanate

The component (b) can be used without particular limitation as long as it is a compound that has two or more isocyanate groups. The component (b) may be a compound (diisocyanate) having two isocyanate groups. Examples of the component (b) include aromatic isocyanates such as diphenylmethane diisocyanate, dimethyldiphenylmethane diisocyanate, tolylene diisocyanate, xylylene diisocyanate, and p-phenylene diisocyanate; alicyclic isocyanates such as dicyclohexylmethane diisocyanate and isophorone diisocyanate; and aliphatic isocyanates such as hexamethylene diisocyanate. The component (b) preferably includes an aromatic diisocyanate and more preferably includes diphenylmethane diisocyanate, from the viewpoint of reactiveness and adhesiveness. The component (b) may be used alone or may be used in combination of two or more kinds thereof.

The urethane prepolymer can be synthesized by a reaction between a polyol and a polyisocyanate. The urethane prepolymer includes a polymer chain, which includes a structural unit derived from a polyol and a structural unit derived from a polyisocyanate, and has two or more isocyanate groups. In a case where such a urethane prepolymer is synthesized, an equivalent ratio of the isocyanate group (NCO) in the polyisocyanate to the hydroxyl group (OH) in the polyol (an equivalent to the isocyanate group (NCO) in the polyisocyanate/an equivalent to the hydroxyl group (OH) in the polyol, NCO/OH) may be 1.1 or more and may be 1.1 to 2.1. When NCO/OH is 1.1 or more, the urethane prepolymer has two or more isocyanate groups and an increase in viscosity of the urethane prepolymer can be suppressed, and thus workability tends to be further improved. When NCO/OH is 2.1 or less, there is tendencies that foam is hardly formed at the time of the moisture-curing reaction of the adhesive composition and a decrease in adhesive strength is easily suppressed.

The temperature and the time for the reaction between the polyol and the polyisocyanate in the case of synthesizing the urethane prepolymer are not particularly limited, and may be, for example, 85° C. to 120° C., and 0.1 minutes to 48 hours.

<Modified Urethane Prepolymer>

The modified urethane prepolymer includes a polymer chain, which includes a structural unit derived from a polyol and a structural unit derived from a polyisocyanate, and has one or more isocyanate groups modified with a castor oil monool. That is, the modified urethane prepolymer is a reaction product between the urethane prepolymer and the castor oil monool and has one or more isocyanate groups modified with the castor oil monool as the terminal group of the main chain or the side chain group of the polymer chain. The adhesive composition of the present embodiment contains such a modified urethane prepolymer, and thereby excellent stretchability after moisture curing can be exhibited. For example, in a case where the urethane prepolymer is a reaction product between the diol and the diisocyanate, the number of isocyanate groups existing as the terminal group of the main chain of the polymer chain is two. When this urethane prepolymer is modified with a castor oil monool, at least one of the isocyanate groups is modified, and thus the number of reaction sites of the modified urethane prepolymer capable of reacting with moisture is small, so that an increase in molecular weight is speculated to be suppressed as compared to the urethane prepolymer.

In the modified urethane prepolymer, the type, the content, and the like of the polyol and the polyisocyanate that constitute the urethane prepolymer before being modified may be the same as those exemplified in the aforementioned urethane prepolymer. The polyol may include an amorphous polyester polyol and a crystalline polyester polyol. The urethane prepolymer before being modified in the modified urethane prepolymer may be the same as or different from the urethane prepolymer contained in the moisture-curable hot-melt adhesive composition of the present embodiment, but may be the same as the urethane prepolymer contained in the moisture-curable hot-melt adhesive composition of the present embodiment from the viewpoint of synthesis.

Component (c): Castor Oil Monool

A component (c) is a monool having a group derived from a castor oil fatty acid (ricinoleic acid) obtained by hydrolysis of castor oil and one hydroxyl group. The component (c) may be, for example, diglyceride of ricinoleic acid. The component (c) may be used alone or may be used in combination of two or more kinds thereof.

As the component (c), commercially available products can be used without any changes. Examples of the commercially available products of the component (c) include URIC H-31 (manufactured by ITOH OIL CHEMICALS CO., LTD.).

The modified urethane prepolymer can be synthesized by a reaction between the urethane prepolymer and the component (c). That is, the modified urethane prepolymer is a reaction product between the urethane prepolymer and the component (c) and is a compound obtained by modifying at least one isocyanate group in the urethane prepolymer with the hydroxyl group of the component (c). The temperature and the time for the reaction between the urethane prepolymer and the component (c) in the case of synthesizing the modified urethane prepolymer are not particularly limited, and may be, for example, 85° C. to 120° C., and 0.1 minutes to 48 hours. Note that, in this reaction, degassing under reduced pressure may be performed.

The moisture-curable hot-melt adhesive composition may further contain a catalyst from the viewpoints of promoting the curing of the urethane prepolymer and exhibiting a higher adhesive strength. Examples of the catalyst include dibutyltin dilaurate, dibutyltin octoate, dimethylcyclohexylamine, dimethylbenzylamine, and trioctylamine. The content of the catalyst may be 0.001 to 0.5% by mass on the basis of the total amount of the moisture-curable hot-melt adhesive composition.

The moisture-curable hot-melt adhesive composition may further contain a thermoplastic polymer from the viewpoints of increasing the rubber elasticity of an adhesive layer to be formed and further improving impact resistance. Examples of the thermoplastic polymer include polyurethanes, ethylene-based copolymers, ethylene-based copolymers, propylene-based copolymers, vinyl chloride-based copolymers, acrylic copolymers, and styrene-conjugated diene block copolymers. The content of the thermoplastic polymer may be 0.1 to 50% by mass on the basis of the total amount of the moisture-curable hot-melt adhesive composition.

The moisture-curable hot-melt adhesive composition may further contain a tackifying resin from the viewpoint of imparting stronger adhesiveness to an adhesive layer to be formed. Examples of the tackifying resin include rosin resins, rosin ester resins, hydrogenated rosin ester resins, terpene resins, terpene phenol resins, hydrogenated terpene resins, petroleum resins, hydrogenated petroleum resins, coumarone resins, ketone resins, styrene resins, modified styrene resins, xylene resins, and epoxy resins. The content of the tackifying resin may be 0.1 to 50% by mass on the basis of the total amount of the moisture-curable hot-melt adhesive composition.

The moisture-curable hot-melt adhesive composition may further contain other components as necessary. Examples of the other components include an antioxidant, a pigment, an ultraviolet absorber, a surfactant, a flame retarder, a filler, a photochromic agent, a thermal coloring preventing agent, a fragrance, an imaging agent, and a thermal crosslinking agent. The content of the other components may be 0.001 to 10% by mass on the basis of the total amount of the moisture-curable hot-melt adhesive composition.

The moisture-curable hot-melt adhesive composition can be produced, for example, by a method including a step of reacting a polyol and a polyisocyanate with each other to obtain a urethane prepolymer including a polymer chain, which includes a structural unit derived from a polyol and a structural unit derived from a polyisocyanate, and having two or more isocyanate groups and a step of reacting a part of the obtained urethane prepolymer and a castor oil monool (adding a castor oil monool to the obtained urethane prepolymer to modify a part of the urethane prepolymer) to obtain a mixture of the urethane prepolymer and the modified urethane prepolymer. In the case of such a production method, the urethane prepolymer and the urethane prepolymer before being modified of the modified urethane prepolymer may be the same as each other. The addition amount of the component (c) may be 0.5 to 5% by mass on the basis of the total amount of the component (a) in the urethane prepolymer.

In a case where a part of the urethane prepolymer and the castor oil monool are reacted with each other (adding a castor oil monool to the obtained urethane prepolymer to modify a part of the urethane prepolymer), an equivalent ratio of the hydroxyl group (OH) in the component (c) to the isocyanate group (NCO) in the urethane prepolymer (an equivalent to the hydroxyl group (OH) in the component (c)/an equivalent to the isocyanate group (NCO) in the urethane prepolymer, OH/NCO) may be, for example, 0.5 or less, 0.3 or less, or 0.15 or less, and may be, for example, 0.01 or more. When OH/NCO is 0.5 or less, a sufficient adhesive strength tends to be obtainable.

The moisture-curable hot-melt adhesive composition can be produced, for example, by a method including a step of separately synthesizing a urethane prepolymer and a modified urethane prepolymer and a step of mixing the synthesized urethane prepolymer and the synthesized modified urethane prepolymer. In the case of such a production method, the urethane prepolymer and the urethane prepolymer before being modified of the modified urethane prepolymer may be the same as or different from each other.

The viscosity at 120° C. of the moisture-curable hot-melt adhesive composition (the moisture-curable hot-melt adhesive composition before curing) may be 0.01 Pa·s or more, 0.05 Pa·s or more, 0.1 Pa·s or more, 0.5 Pa·s or more, 1 Pa·s or more, or 2 Pa·s or more, and may be 100 Pa·s or less, 80 Pa·s or less, 60 Pa·s or less, 50 Pa·s or less, 30 Pa·s or less, or 20 Pa·s or less. When the viscosity at 120° C. is within the aforementioned range, workability at the time of coating by a dispenser or the like becomes favorable. In the present specification, the viscosity at 120° C. of the moisture-curable hot-melt adhesive composition (the moisture-curable hot-melt adhesive composition before curing) means a value that is measured by the method described in Examples.

In the moisture-curable hot-melt adhesive composition, the isocyanate group of the urethane prepolymer contained in the adhesive composition reacts with moisture in air or moisture on the surface of an adherend, and thus the molecular weight is increased by allowing the adhesive composition to be left to stand (to be cured), for example, at a temperature of 23° C. and 50% RH (relative humidity) for 24 hours and cross-linking is generated, thereby forming a cured product of the adhesive composition. Both the adherends are bonded to each other through the formed cured product of the adhesive composition.

The adhesive strength as measured in a bonded object which is obtained by pressure bonding both adherends using the moisture-curable hot-melt adhesive composition and curing the adhesive composition (the adhesive strength of the moisture-curable hot-melt adhesive composition after curing) may be 1 N/4 mm or more, 3 N/4 mm or more, or 5 N/4 mm or more. The upper limit of the adhesive strength after curing is not particularly limited, and may be 30 N/4 mm or less. Note that, in the present specification, the adhesive strength after curing means a value that is measured by the method described in Examples. That is, the adhesive strength after curing means an adhesive strength of the moisture-curable hot-melt adhesive composition after curing in a bonded object obtained by allowing a laminated body, which is obtained by pressure bonding both adherends using the moisture-curable hot-melt adhesive composition at 120° C., to be left to stand (to be cured) at 23° C. and 50% RH (relative humidity) for 24 hours.

The elastic modulus in tension of the moisture-curable hot-melt adhesive composition after curing (the elastic modulus in tension of the cured product of the moisture-curable hot-melt adhesive composition) may be 0.01 MPa or more, 0.05 MPa or more, 0.1 MPa or more, 0.5 MPa or more, 1 MPa or more, 5 MPa or more, 10 MPa or more, or 15 MPa or more, and may be 45 MPa or less, 40 MPa or less, 35 MPa or less, or 30 MPa or less, from the viewpoint of flexibility. In the case of using the moisture-curable hot-melt adhesive composition in clothing or wearable products, when the elastic modulus in tension is within the aforementioned range, uncomfortable feeling when the clothing or wearable products are worn can be more decreased. Note that, in the present specification, the elastic modulus in tension after curing means a value that is measured by the method described in Examples. That is, the elastic modulus in tension after curing means an elastic modulus in tension of a cured product which is obtained by allowing the moisture-curable hot-melt adhesive composition to be left to stand (to be cured) at 23° C. and 50% RH (relative humidity) for 24 hours.

The percentage elongation of the moisture-curable hot-melt adhesive composition after curing may be 900% or more, 1000% or more, or 1100% or more. Note that, in the present specification, the percentage elongation after curing means a value that is measured by the method described in Examples. That is, the elastic modulus in tension after curing means a percentage elongation of a cured product which is obtained by allowing the moisture-curable hot-melt adhesive composition to be left to stand (to be cured) at 23° C. and 50% RH (relative humidity) for 24 hours.

The moisture-curable hot-melt adhesive composition can be used by being melted, for example, at 60° C. to 130° C. and then being coated to an adherend. The coating method is not particularly limited, and examples thereof include methods using coating devices such as a bar coater, a die coater, a roll coater, and a spray. In the case of coating to a narrow portion such as a small component, a dispenser is suitable. The coating pattern of the moisture-curable hot-melt adhesive composition can be appropriately set, but examples of the coating pattern include a dot shape, a linear shape, a zigzag shape, a planar shape, and a curved shape.

The adherend is not particularly limited, and may be, for example, a cloth or paper. The moisture-curable hot-melt adhesive composition can be suitably used for pasting a plurality of adherends selected from cloths and paper to each other. Herein, combinations of adherends may be a cloth and a cloth, paper and paper, or a cloth and paper.

The moisture-curable hot-melt adhesive composition may be formed into a film shape and then used. Such an adhesive film can be formed, for example, by coating the moisture-curable hot-melt adhesive composition onto a support film such as a PET (polyethylene terephthalate) film. The thickness of the moisture-curable hot-melt adhesive film may be 10 μm or more, 20 μm or more, or 30 μm or more, and may be 300 μm or less, 250 μm or less, or 200 μm or less. When the thickness of the moisture-curable hot-melt adhesive film is increased, adhesiveness can be secured, and when the thickness of the moisture-curable hot-melt adhesive film is decreased, stretchability tends to be more easily secured.

The moisture-curable hot-melt adhesive composition can be suitably used in garments (apparel products) such as clothing, supporters, bags, wallets, interior accessories, various covers, cases, wearable devices, and the like.

[Bonded Object]

A bonded object of an embodiment includes: a first adherend; a second adherend; and an adhesive layer bonding the first adherend and the second adherend to each other, in which the adhesive layer contains a cured product of the aforementioned moisture-curable hot-melt adhesive composition. Examples of articles including the bonded object include garments (particularly, a seamless garment).

As the first adherend and the second adherend, those exemplified in the aforementioned adherend can be exemplified. That is, the first adherend and the second adherend may be a cloth or paper. Combinations of the first adherend and the second adherend may be a cloth and a cloth, paper and paper, or a cloth and paper. In a case where an article including the bonded object is a garment, the first adherend and the second adherend may be cloths.

The bonded object can be produced, for example, by a method including a step of melting the aforementioned moisture-curable hot-melt adhesive composition and coating the melted moisture-curable hot-melt adhesive composition to a first adherend to form an adhesive layer, a step of disposing a second adherend onto the adhesive layer and pressure bonding the second adherend to obtain a laminated body, and a step of curing the adhesive layer in the obtained laminated body to obtain a bonded object. Examples of the method of curing the adhesive layer include a method of allowing the adhesive layer to be left to stand in air (to be cured) (for example, at 23° C. for 24 hours). The adhesive layer in the bonded object may contain a cured product of the moisture-curable hot-melt adhesive composition.

Examples of the method of pressure bonding the second adherend include a method of performing pressure bonding using a pressure roller or the like.

FIG. 1 is a schematic diagram illustrating a process of producing a bonded object of an embodiment, and FIGS. 1(a), 1(b), 1(c), and 1(d) are schematic diagrams illustrating respective steps. Hereinafter, a process of producing a bonded object using a stretchable fabric that is a cloth as the first adherend and the second adherend will be described with reference to FIG. 1.

First, a stretchable fabric 1 is placed along a jig 10 (see FIG. 1(a)). Next, the moisture-curable hot-melt adhesive composition of the present embodiment is coated to a predetermined portion of the stretchable fabric 1 to form an adhesive layer 4 (see FIG. 1(b)). The material and the shape of the jig 10 are not particularly limited but can be appropriately selected according to purposes. The coating of the adhesive composition may be performed, for example, using a dispenser. Next, a stretchable fabric 2 is disposed on the adhesive layer 4, and the stretchable fabric 1 and the stretchable fabric 2 are pasted to each other through the adhesive layer 4 while a pressure is applied from the upper side of the stretchable fabric 2 by a roll or the like, thereby obtaining a laminated body 20 (see FIGS. 1(c) and 1(d)). Thereafter, the adhesive layer 4 in the laminated body 20 is moisture-cured by allowing the laminated body 20 to be left to stand (to be cured), and thereby a bonded object of a stretchable fabric (a garment of a stretchable fabric, more specifically, a seamless garment of a stretchable fabric) can be obtained. The adhesive layer 4 in the bonded object contains a cured product of the moisture-curable hot-melt adhesive composition.

In FIG. 1(b), the moisture-curable hot-melt adhesive composition adhesive film, which has been formed in advance on a releasable substrate, may be transferred onto the stretchable fabric 1 to form the adhesive layer 4. Furthermore, the adhesive layer may be provided on the stretchable fabric 2 side and then pasted to the stretchable fabric 1.

[Garment]

A garment of an embodiment includes the aforementioned bonded object. In this case, the first adherend and the second adherend are cloths. The garment may be a seamless garment.

EXAMPLES

Hereinafter, the present invention will be more specifically described by means of Examples. However, the present invention is not limited to these Examples.

Examples 1 to 4 and Comparative Example 1

<Preparation of Moisture-Curable Hot-Melt Adhesive Composition>

The polyol, the polyisocyanate, and the castor oil monool of types and mass parts shown in Table 1 were used. The polyisocyanate was added to the polyol, which had been subjected to a dehydration treatment by a vacuum dryer in advance, so that the equivalent ratio of the isocyanate group in the polyisocyanate to the hydroxyl group in the polyol (the equivalent to (NCO)/the equivalent to (OH)) became a numerical value shown in Table 1, followed by mixing homogeneously. This mixture was reacted at 110° C. for 1 hour to obtain a urethane prepolymer. As shown in Table 1, the equivalent to (NCO) equivalent/the equivalent to (OH) is larger than 1, and thus it is speculated that the obtained urethane prepolymer has a polymer chain, which includes a structural unit derived from a polyol and a structural unit derived from a polyisocyanate, and two or more isocyanate groups bonded to the polymer chain. Next, a castor oil monool of a mass part shown in Table 1 was added to the obtained urethane prepolymer and the resultant product was further subjected to degassing stirring under reduced pressure at 110° C. for 1 hour, thereby obtaining a moisture-curable hot-melt adhesive composition. As considered from the addition amount of the castor oil monool, it is speculated that the moisture-curable hot-melt adhesive composition is a mixture including a urethane prepolymer having two or more isocyanate groups and a modified urethane prepolymer having one or more isocyanate groups modified with a castor oil monool.

The details of respective components shown in Table 1 are as follows.

Polyol (a)

(a-1-1) Amorphous polyester polyol: amorphous polyester polyol including adipic acid and isophthalic acid and including, as a main component, ethylene glycol and neopentyl glycol, the number of hydroxyl groups: 2, number average molecular weight: 2000

(a-2-1) Crystalline polyester polyol: crystalline polyester polyol including adipic acid and including, as a main component, ethylene glycol and 1,4-butanediol, the number of hydroxyl groups: 2, number average molecular weight: 2000

(a-2-2) Crystalline polyester polyol: crystalline polyester polyol including adipic acid and including, as a main component, 1,6-hexanediol, the number of hydroxyl groups: 2, number average molecular weight: 5000

(a-3-1) Polyether polyol: manufactured by Asahi Glass Co., Ltd., trade name: EXCENOL 2020, number average molecular weight: 2000, the number of hydroxyl groups: 2

Polyisocyanate (b)

(b-1) Diphenylmethane diisocyanate: manufactured by Nippon Polyurethane Industry Co., Ltd., trade name: Millionate MT, the number of isocyanate groups: 2

Castor Oil Monool (c)

(c-1) Castor oil monool: manufactured by ITOH OIL CHEMICALS CO., LTD., trade name: URIC H-31, the number of hydroxyl groups: 1

<Viscosity Before Curing>

The viscosities of the moisture-curable hot-melt adhesive compositions of Examples 1 to 4 and Comparative Example 1 before curing were measured using a BH-HH type small sample rotation viscometer (manufactured by TOM SANGYO CO., LTD.) under conditions of Rotor No. 4, a sample amount of 15 g, and 120° C. Results are shown in Table 1.

<Adhesive Strength after Curing>

The moisture-curable hot-melt adhesive compositions of Examples 1 to 4 and Comparative Example 1 were melted at 120° C. and coated onto a stretchable fabric (a fabric weaved using threads formed in such a manner that urethane is surrounded by nylon, thickness: 520 μm) by a dispenser. Thereafter, the same stretchable fabric was disposed on the coated adhesive composition and pressure bonded at 60° C. until the thickness of the layer composed of the adhesive composition became 100 μm, thereby obtaining a laminated body. The aforementioned laminated body was left to stand at 23° C. and 50% RH for 24 hours and the layer composed of the adhesive composition was cured, thereby producing a bonded object. The adhesive strength of the bonded object was measured by a T-type peeling strength test using a tensile tester (manufactured by SHIMADZU CORPORATION, trade name: Autograph AGS-X) under conditions of a measurement temperature of 25° C. and a tension rate of 100 mm/min, and the adhesive strength of the moisture-curable hot-melt adhesive composition after curing was obtained. Results are shown in Table 1.

<Elastic Modulus in Tension after Curing and Percentage Elongation after Curing>

Two separator films were prepared. The moisture-curable hot-melt adhesive compositions of Examples 1 to 4 and Comparative Example 1 were melted at 120° C. and coated onto one of the separator films, the moisture-curable hot-melt adhesive composition was interposed between the coated separator film and the other of the separator films, and the resultant product was pressed using a low-pressure press testing machine (manufactured by Inaoka Foundry, Ltd.) under conditions of a pressing temperature of 100° C. and a pressing pressure of 400 kPa to have a thickness of 100 μm, thereby obtaining an adhesive film composed of the moisture-curable hot-melt adhesive composition. The obtained adhesive film was left to stand at 23° C. and 50% RH for 24 hours so as to be cured, thereby obtaining a cured product of the adhesive film. The obtained cured product of the adhesive film was punched into a dumbbell shape No. 1 using a dumbbell cutter (manufactured by DUMBBELL CO., LTD.) and the separator film was peeled off to obtain a measurement sample. The elastic modulus in tension and the percentage elongation were measured using Autograph AGS-X (manufactured by SHIMADZU CORPORATION) under conditions of a measurement temperature of 23° C., a tension rate of 10 mm/min, and a distance between chucks of 40 mm. The elastic modulus in tension was obtained from the gradient of a stress-strain curve in the early stage of pulling. The percentage elongation was obtained by the following method. The measurement sample was elongated at break at a tension rate of 100 mm/min. The sample length before measurement and the length at the time of elongation at break were measured and designated as L1 and L2, respectively. The percentage elongation was calculated by substituting L1 and L2 thus measured into the following equation. Respective results are shown in Table 1.

Percentage elongation (%)=L2/L1×100

TABLE 1

| Item | | Exam. 1 | Exam. 2 | Exam. 3 | Exam. 4 | Comp. Exam. 1 |
|---|---|---|---|---|---|---|
| Polyol (a) | (a-1-1) | 45.0 | 60.0 | 45.0 | 45.0 | 45.0 |
| | (a-2-1) | 35.0 | 25.0 | 30.0 | 35.0 | 35.0 |
| | (a-2-2) | 15.0 | 15.0 | 20.0 | 15.0 | 15.0 |
| | (a-3-1) | 5.0 | — | 5.0 | 5.0 | 5.0 |
| Polyisocyanate (b) | (b-1) | 22.5 | 22.6 | 20.7 | 21.2 | 22.5 |
| Equivalent to (NCO)/Equivalent to (OH) | | 2.0 | 2.0 | 1.9 | 1.9 | 2.0 |
| Castor oil monool (c) | (c-1) | 1.5 | 1.5 | 2.0 | 3.0 | — |
| Characteristics | Viscosity (Pa·s) at 120° C. before curing | 4 | 13 | 6 | 5 | 4 |
| | Adhesive strength (N/4 mm) after curing | 12.1 | 14.1 | 10.9 | 11.9 | 12.5 |
| | Elastic modulus in tension (MPa) after curing | 23 | 20 | 35 | 25 | 48 |
| | Percentage elongation (%) after curing | 1100 | 1000 | 1050 | 1300 | 875 |

The moisture-curable hot-melt adhesive compositions of Examples 1 to 4 containing the modified urethane prepolymer had a lower elastic modulus in tension and a larger percentage elongation than the moisture-curable hot-melt adhesive composition of Comparative Example 1 not containing the modified urethane prepolymer. From the above results, it was confirmed that the moisture-curable hot-melt adhesive composition of the present invention can form a cured product having excellent stretchability.

REFERENCE SIGNS LIST 1, 2: stretchable fabric, 4: adhesive layer, 10: jig, 20: laminated body.

The invention claimed is:

1. A moisture-curable hot-melt adhesive composition comprising:
   a modified urethane prepolymer including a polymer chain, which includes a structural unit derived from a polyol and a structural unit derived from a polyisocyanate, and having one or more isocyanate groups modified with a castor oil monool; and
   a urethane prepolymer, different than the modified urethane prepolymer, including a polymer chain, which includes a structural unit derived from a polyol and a structural unit derived from a polyisocyanate, having two or more isocyanate groups, and not having an isocyanate group modified with a castor oil monool.

2. The moisture-curable hot-melt adhesive composition according to claim 1, wherein the polyol in the urethane prepolymer and the polyol in the modified urethane prepolymer include an amorphous polyester polyol and a crystalline polyester polyol.

3. The moisture-curable hot-melt adhesive composition according to claim 1, wherein the moisture-curable hot-melt adhesive composition is used for pasting a plurality of adherends selected from cloths and paper to each other.

4. A bonded object comprising:
   a first adherend;
   a second adherend; and
   an adhesive layer bonding the first adherend and the second adherend to each other, wherein
   the adhesive layer contains a cured product of the moisture-curable hot-melt adhesive composition according to claim 1.

5. A garment comprising the bonded object according to claim 4, wherein the first adherend and the second adherend are cloths.

6. The moisture-curable hot-melt adhesive composition according to claim 1, wherein the modified urethane prepolymer is a reaction product between the urethane prepolymer and the castor oil monool.

7. The moisture-curable hot-melt adhesive composition according to claim 1, wherein the moisture-curable hot-melt adhesive composition is produced by a method including:
   a step of reacting a polyol and a polyisocyanate with each other to obtain a urethane prepolymer including a polymer chain, which includes a structural unit derived from a polyol and a structural unit derived from a polyisocyanate, and having two or more isocyanate groups; and
   a step of reacting a part of the obtained urethane prepolymer and a castor oil monool to modify a part of the urethane prepolymer to form the modified urethane prepolymer and to obtain a mixture of the urethane prepolymer and the modified urethane prepolymer.

8. The moisture-curable hot-melt adhesive composition according to claim 7, wherein an amount of the castor oil monool reacted with the part of the obtained urethane prepolymer is 0.5 to 5% by mass on the basis of a total amount of the polyol in the urethane prepolymer.

9. The moisture-curable hot-melt adhesive composition according to claim 7, wherein an equivalent ratio of the hydroxyl group (OH) in the castor oil monool to the isocyanate group (NCO) in the urethane prepolymer (an equivalent of the hydroxyl group (OH) in the castor oil monool/an equivalent of the isocyanate group (NCO) in the urethane prepolymer, OH/NCO) is 0.5 or less.

10. The moisture-curable hot-melt adhesive composition according to claim 9, wherein an equivalent ratio of the hydroxyl group (OH) in the castor oil monool to the isocyanate group (NCO) in the urethane prepolymer (an equivalent of the hydroxyl group (OH) in the castor oil monool/an equivalent of the isocyanate group (NCO) in the urethane prepolymer, OH/NCO) is 0.01 or more.

11. The moisture-curable hot-melt adhesive composition according to claim 7, wherein an equivalent ratio of the hydroxyl group (OH) in the castor oil monool to the isocyanate group (NCO) in the urethane prepolymer (an equivalent of the hydroxyl group (OH) in the castor oil monool/an equivalent of the isocyanate group (NCO) in the urethane prepolymer, OH/NCO) is 0.3 or less.

12. The moisture-curable hot-melt adhesive composition according to claim 7, wherein an equivalent ratio of the hydroxyl group (OH) in the castor oil monool to the isocyanate group (NCO) in the urethane prepolymer (an equivalent of the hydroxyl group (OH) in the castor oil monool/an equivalent of the isocyanate group (NCO) in the urethane prepolymer, OH/NCO) is 0.15 or less.

\* \* \* \* \*